(12) United States Patent
Barthram et al.

(10) Patent No.: US 8,561,053 B2
(45) Date of Patent: Oct. 15, 2013

(54) METHOD AND SYSTEM FOR MANAGING A COMPUTER SYSTEM

(75) Inventors: Philip Barthram, Heywood Nr. Westbury (GB); Andrzej Zalewski, Vallingby (SE); Johan Skoog, Sollentuna (SE)

(73) Assignee: CA, Inc., Islandia, NY (US)

( * ) Notice: Subject to any disclaimer, the term of this patent is extended or adjusted under 35 U.S.C. 154(b) by 1653 days.

(21) Appl. No.: 10/759,774

(22) Filed: Jan. 16, 2004

(65) Prior Publication Data

US 2005/0060397 A1    Mar. 17, 2005

Related U.S. Application Data

(63) Continuation of application No. 10/418,458, filed on Apr. 17, 2003, now abandoned.

(60) Provisional application No. 60/374,228, filed on Apr. 19, 2002.

(51) Int. Cl.
*G06F 9/45* (2006.01)

(52) U.S. Cl.
USPC .......................................... 717/171; 717/168

(58) Field of Classification Search
USPC .................................................. 717/168–178
See application file for complete search history.

(56) References Cited

U.S. PATENT DOCUMENTS

| | | | | |
|---|---|---|---|---|
| 5,742,829 A * | 4/1998 | Davis et al. | | 717/178 |
| 5,933,647 A * | 8/1999 | Aronberg et al. | | 717/178 |
| 6,026,438 A * | 2/2000 | Piazza et al. | | 709/221 |
| 6,044,461 A * | 3/2000 | Agha et al. | | 713/1 |
| 6,049,670 A * | 4/2000 | Okada et al. | | 717/177 |
| 6,098,067 A | 8/2000 | Erickson | | |
| 6,105,063 A * | 8/2000 | Hayes, Jr. | | 709/223 |
| 6,119,157 A * | 9/2000 | Traversat et al. | | 709/220 |
| 6,178,443 B1 * | 1/2001 | Lin | | 709/208 |
| 6,269,456 B1 * | 7/2001 | Hodges et al. | | 714/38 |
| 6,282,712 B1 * | 8/2001 | Davis et al. | | 717/170 |
| 6,311,321 B1 * | 10/2001 | Agnihotri et al. | | 717/120 |
| 6,532,588 B1 * | 3/2003 | Porter | | 717/170 |
| 6,854,016 B1 * | 2/2005 | Kraenzel et al. | | 709/229 |
| 6,915,451 B2 * | 7/2005 | Fitzgerald et al. | | 714/20 |
| 2001/0011341 A1 * | 8/2001 | Hayes JR. et al. | | 712/11 |
| 2002/0124245 A1 * | 9/2002 | Maddux et al. | | 717/176 |
| 2002/0129356 A1 * | 9/2002 | Hellerstein et al. | | 717/177 |
| 2003/0159137 A1 * | 8/2003 | Drake et al. | | 717/172 |

OTHER PUBLICATIONS

Mike Lubanski and Darshan Doshi, "SMS 2 Administration", SAMS, Feb. 2000.*

Edgar Brovick, Doug Hauger, and William C. Wade III, "Windows 2000 Active Directory", SAMS, Feb. 2000.*

(Continued)

*Primary Examiner* — Wei Zhen
*Assistant Examiner* — Matthew Brophy
(74) *Attorney, Agent, or Firm* — Baker Botts, LLP (57) ABSTRACT

A method and system for managing a plurality of computers, wherein at least one of the plurality of computers is associated with a user having a user characteristic. The method comprises inputting selection information including the user characteristic, inputting management information, selecting at least one of the plurality of computers based on the selection information, and modifying the at least one selected computer based on the management information.

81 Claims, 5 Drawing Sheets

(56) References Cited

OTHER PUBLICATIONS

Lupu, Emil C., and Morris Sloman. "Conflicts in policy-based distributed systems management." Software Engineering, IEEE Transactions on 25.6 (1999): 852-869.*

Thompson, J. Patrick. "Web-based enterprise management architecture." Communications Magazine, IEEE 36.3 (1998): 80-86.*

DeBellis, Michael, and Christine Haapala. "User-centric software engineering." IEEE Expert 10.1 (1995): 34-41.*

Businesswire release by Novadigm Inc—Aug. 27, 1997, "Patent Infringement Lawsuit May Impact W3C Protocol Submission," Businesswire, http://www.w3.org/Submission/1997/10/r.html, 3 pages, Aug. 27, 1997.

Application No. 03 724 115.5—2221, Ref: HCD/J00047023EP, Communication pursuant to Article 94(3) EPC, document dated Aug. 27, 2009, 5 pages, Reporting Date: Oct. 30, 2009.

Murray, et al.; *USENIX; Large Scale System Administration of Windows NT Workshop; Effective Use of Individual User Profiles with Software Distribution*; 8 pages, 1997.

*IntelliMirror Lets Your Information "Follow" You*; XP-002354982; 3 pages, Jun. 9, 1999.

*European Patent Office; Summons to Attend Oral Proceedings Pursuant to Rule 114(1) Epc* for International Application No. 03724115.5-2221; 7 pages, Feb. 18, 2011.

*European Patent Office; Minutes of the oral proceedings before the Examining Devision* for International Application No. 03724115.5; 29 pages, Jul. 15, 2011.

* cited by examiner

METHOD AND SYSTEM FOR MANAGING A COMPUTER SYSTEM

REFERENCES TO RELATED APPLICATIONS

This is a continuation of application Ser. No. 10/418,458 filed Apr. 17, 2003 now abandoned which claims the benefit of Provisional application No. 60/374,228 filed in the United States on Apr. 19, 2002.

This application claims the benefit of Provisional Application Ser. No. 60/374,228, filed on Apr. 19, 2002, the contents of which are herein incorporated by reference.

BACKGROUND

1. Technical Field

The present disclosure relates to computer systems. More specifically, the present disclosure relates to a method and system for managing a computer system.

2. Description of the Related Art

One beneficial characteristic of computers today is their versatility, specifically, their ability to be used by multiple users and for multiple purposes. The capabilities of a computer, including desktop personal computers, laptop computers, workstations, point of sale computers, and other computer-based devices, may be partially determined by an operating system. Operating systems provide a software platform on top of which other programs, called application programs, can run. Some operating systems permit accounts for multiple users and may have different application programs installed and accessible to each user. A single computer may hold multiple operating systems, multiple application programs, and even multiple versions of a single application program.

Computers located in different areas may be connected via a network, for example, a local-area network (LAN) or wide-area network (WAN). As a result, a computer administrator has the ability to monitor and control a large number of computers from a remote location. A computer administrator has the responsibility to manage the many users, purposes, operating systems, applications and versions of applications installed on a computer.

Traditionally, computer management has been performed in a computer-centric fashion. For example, computer administrators have been presented with lists of computers to be managed. Often, computers are labeled with unique alphanumeric sequences, which, while adequately identifying each computer, do not identify the user associated with a particular computer. Accordingly, if a policy change needs to be effected for certain users, it can be difficult for an administrator to determine which computers are associated with the user so that the policy change can be implemented only on those machines associated with that user. One solution may be to label a computer with the name of its user; however, because a computer may have multiple users and because a user may operate multiple computers, this solution may not always be sufficient. In a computer-centric system, computers may be categorized by groups to reflect geographical location or functional purpose. For example, a supermarket chain may manage thousands of point-of-sale (POS) computer systems, and may configure the computers based on location and function.

Computer management may also be performed in a user-centric fashion. Management from the viewpoint of users, rather than computers they operate, can be more intuitive for the computer administrator and easier to maintain. This type of system is referred to herein as user-centric computer management. The goal of user-centric computer management is to offer computer administrators an alternative view of their enterprise that reflects the user-centric model. In order to operate with existing computer-centric systems, it may be desirable to provide a computer management system in which the traditional computer-centric model remains and may be modified to operate with the user-centric model.

Many companies have, or are moving toward, a centralized store of common enterprise data, for example, employee information, held in a directory. These directories are databases which often hold information about the personnel of the enterprise,. their roles and geographical location. For example, a company could have a directory design using a container hierarchy reflecting the company's geographical structure and groups to reflect the roles of individual users. Where such directories exist, it may also be desirable for user-centric management systems to be able to take advantage of these centralized stores of data by integrating with existing management systems in order to access the directory information to retrieve user information, including employee name, location, occupational role, etc.

SUMMARY

The present disclosure relates to a method for managing a plurality of computers, wherein at least one of the plurality of computers is associated with a user having a user characteristic. The method comprises inputting selection information including the user characteristic, inputting management information, selecting at least one of the plurality of computers based on the selection information, and modifying the at least one selected computer based on the management information.

In another embodiment, the method comprises inputting selection information including one of the user characteristic and a computer characteristic into a selected computer, transmitting the selection information to a managing computer, searching in a database for the selection information and management information associated with the selection information, and modifying the selected computer based on the management information.

The present disclosure also relates to a computer recording medium including computer executable code for managing a plurality of computers, wherein least one of the plurality of computers is associated with a user having a user characteristic. The computer recording medium comprises code for inputting selection information including the user characteristic, code for inputting management information, code for selecting at least one of the plurality of computers based on the selection information, and code for modifying the at least one selected computer based on the management information.

In another embodiment, the computer recording medium includes code for inputting selection information including one of the user characteristic and a computer characteristic into a selected computer, code for transmitting the selection information to a managing computer, code for searching in a database for the selection information and management information associated with the selection information, and code for modifying the selected computer based on the management information.

The present disclosure also relates to a programmed computer system for managing a plurality of computers, wherein at least one of the plurality of computers is associated with a user having a user characteristic. The programmed computer system resides on a computer-readable medium and comprises instructions for causing a computer to input selection information including the user characteristic, input management information, select at least one of the plurality of computers based on the selection information, and modify the at least one selected computer based on the management information.

In another embodiment, the programmed computer system comprises instructions for causing a computer to input selection information including one of the user characteristic and a computer characteristic into a selected computer, transmit the selection information to a managing computer, search in a database for the selection information and management information associated with the selection information, and modify the selected computer based on the management information.

The present disclosure also relates to a programmed computer apparatus for managing a plurality of computers, wherein at least one of the plurality of computers is associated with a user having a user characteristic. The programmed computer apparatus performs steps comprising inputting selection information including the user characteristic, inputting management information, selecting at least one of the plurality of computers based on the selection information, and modifying the at least one selected computer based on the management information.

In another embodiment, the programmed computer apparatus performs steps comprising inputting selection information including one of the user characteristic and a computer characteristic into a selected computer, transmitting the selection information to a managing computer, searching in a database for the selection information and management information associated with the selection information, and modifying the selected computer based on the management information.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Figure 1:
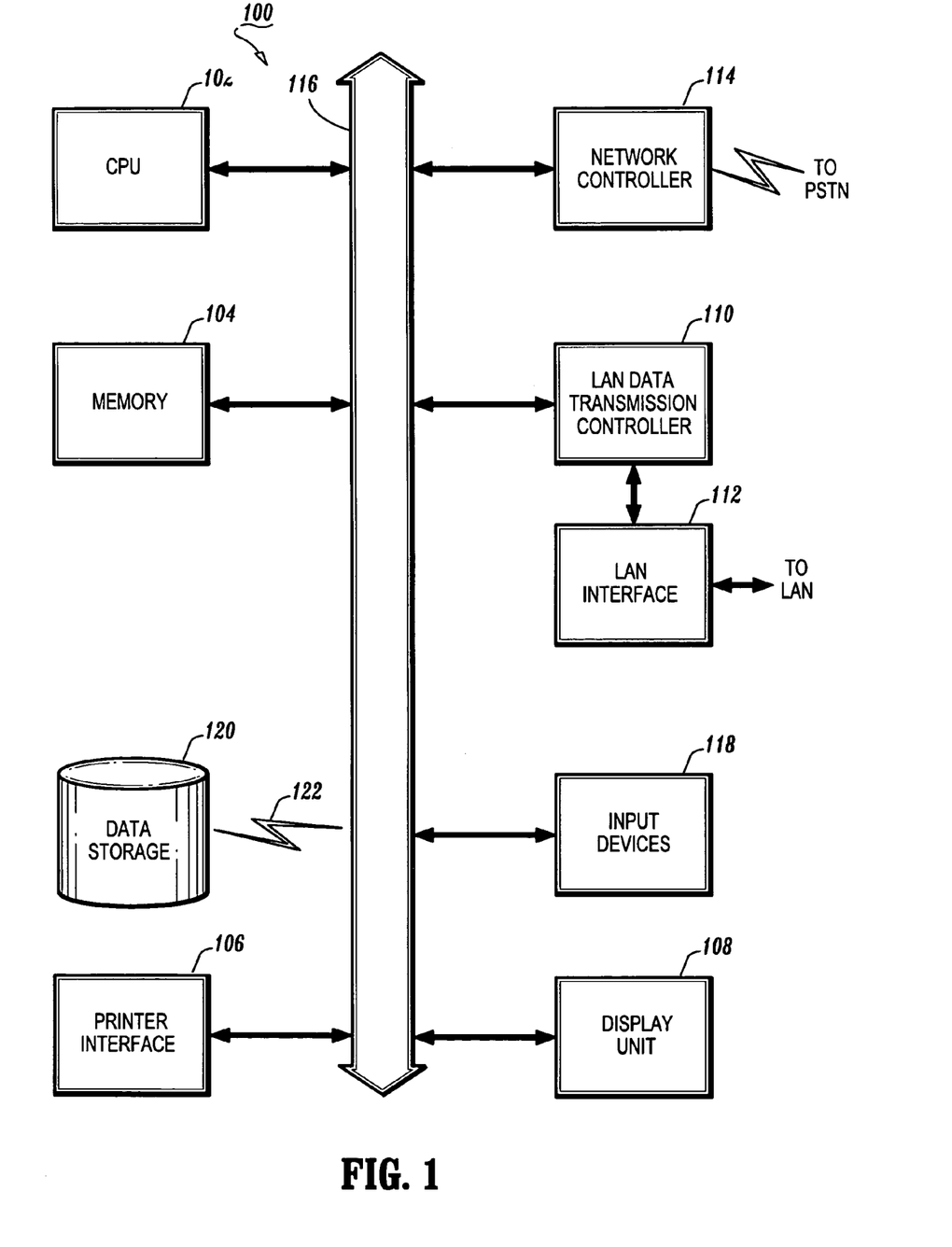
FIG. 1 shows an example of a computer system capable of implementing the method and system of the present disclosure.

FIG. 1 shows an example of a computer system which may be managed by a management system according to the present disclosure, or which may execute such a management system. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

An example of a computer system capable of implementing the present method and system is shown in FIG. 1. The computer system referred to generally as system 100 may include a central processing unit (CPU) 102, memory 104, for example, Random Access Memory (RAM), a printer interface 106, a display unit 108, a (LAN) local area network data transmission controller 110, a LAN interface 112, a network controller 114, an internal bus 116 and one or more input devices 118, for example, a keyboard, mouse etc. As shown, the system 100 may be connected to a data storage device, for example, a hard disk, 120, via a link 122.

Figure 2:
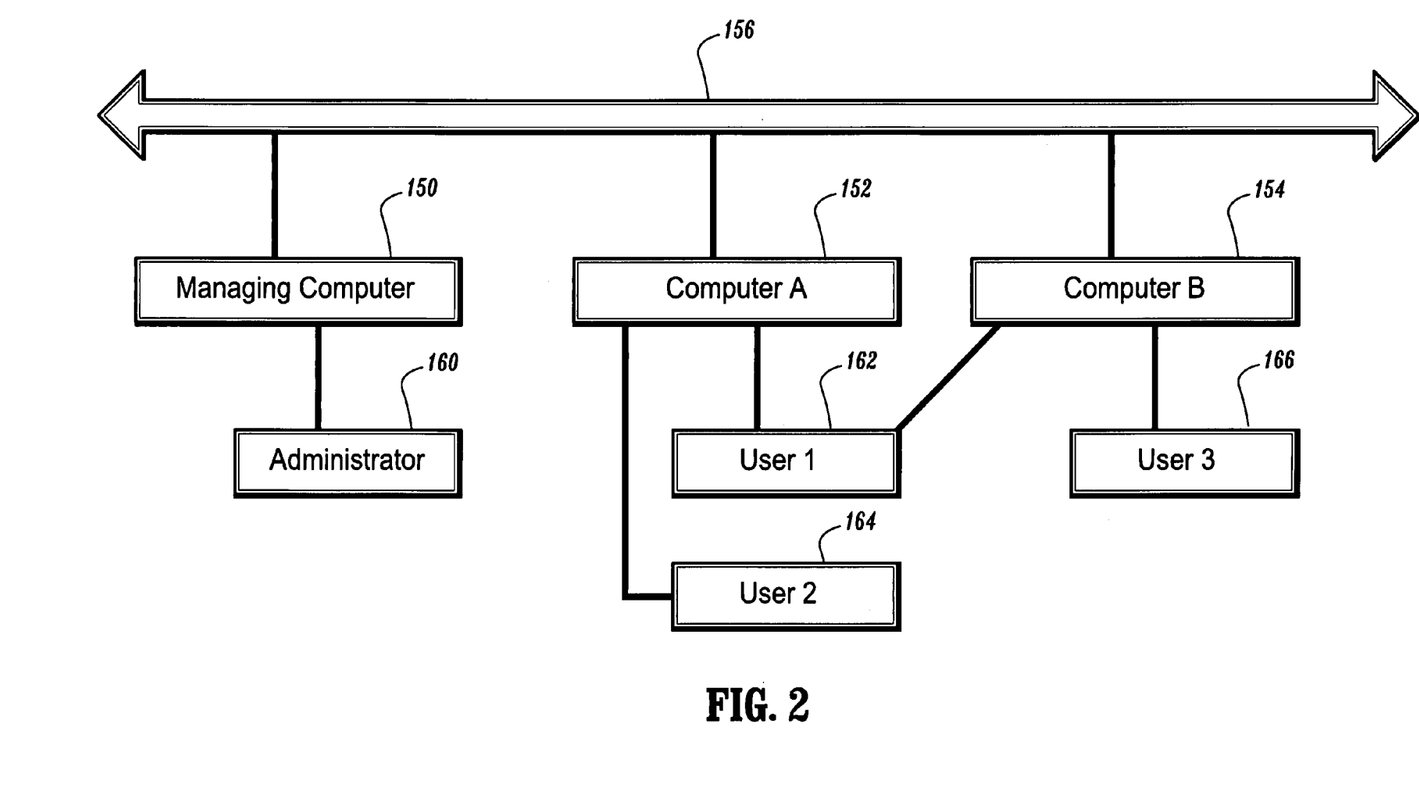
FIG. 2 shows an example of a network connecting a managing computer system and other computer systems according to the present disclosure.

FIG. 2 shows an example of a network connecting a managing computer system and other computer systems according to the present disclosure. Managing computer system 150 and Computer A 152 and Computer B 154 may be of the type of computer system 100 as shown in FIG. 1, or they may be of any other type of stationary or portable computing system. Managing computer system 150 and Computer A 152 and Computer B 154 may be connected via a network 156, such as the Internet, a local-area network (LAN), wide-area network (WAN), or wireless network. In the example shown in FIG. 2, users of the computers are shown along with the computers with which they are associated. For example, an Administrator 160 is associated with a Managing computer system 150, User 1 162 is associated with both Computer A 152 and Computer B 154, User 2 164 is associated with Computer A 152, and User 3 166 is associated with Computer B 154.

User-Model and Computer-Model

The present system and method allows an administrator to view the system as a number of users and to effect policy changes on to those users. A Managing computer system 150 will automatically determine what to do with the individual machines on the system belonging to those users in order to implement a policy change.

A user-centric computer management system according to the present disclosure allows a computer administrator to manage computers and other information technology (IT) resources through a view of the users of those resources. Resources may be represented and displayed graphically to the administrator at a managing computer system via, for example, a computer monitor. To offer this view, data models of the existing computer-centric management systems may be modified to include a user-object data structure corresponding to a user. The user-object data structure may provide a link to one or more computer-object data structures which store information such as, for example, inventory, software installations including application programs, operating systems etc., computer configuration tasks, and users associated with the computer. In another aspect of the system of the present disclosure, the user-object may instead store the information stored in each associated computer-model and may be updated accordingly.

When a user is associated with one or more computers, the user-object for that user may contain a link to each of the associated computers. Accordingly, if a computer is associated with more than one user, the user-object for each user may have a link to the computer-object of the associated computer. In one aspect of the present disclosure, when a user-object for a user is displayed, the system retrieves and displays information stored in the linked computer-objects corresponding to computers with which the user is associated.

The user-object may be identified by the user account used to log on to a computer running a desktop agent, the user account may then be reported back to a managing computer for registration. The computer administrator has the option to deactivate user registration.

Figure 3A:
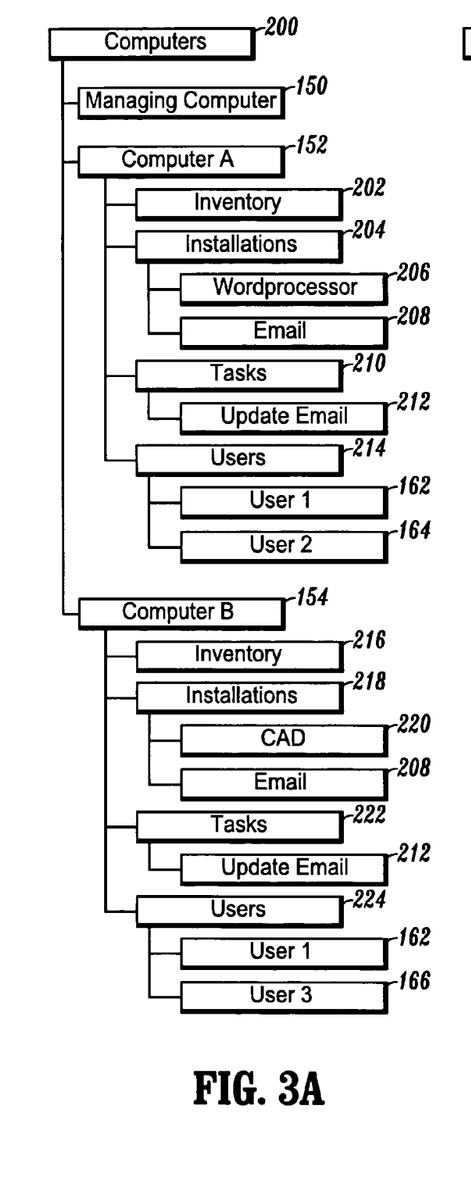
FIGS. 3A-3B show examples of a computer-object view and a user-object view according to the method and system of the present disclosure.
Figure 3B:
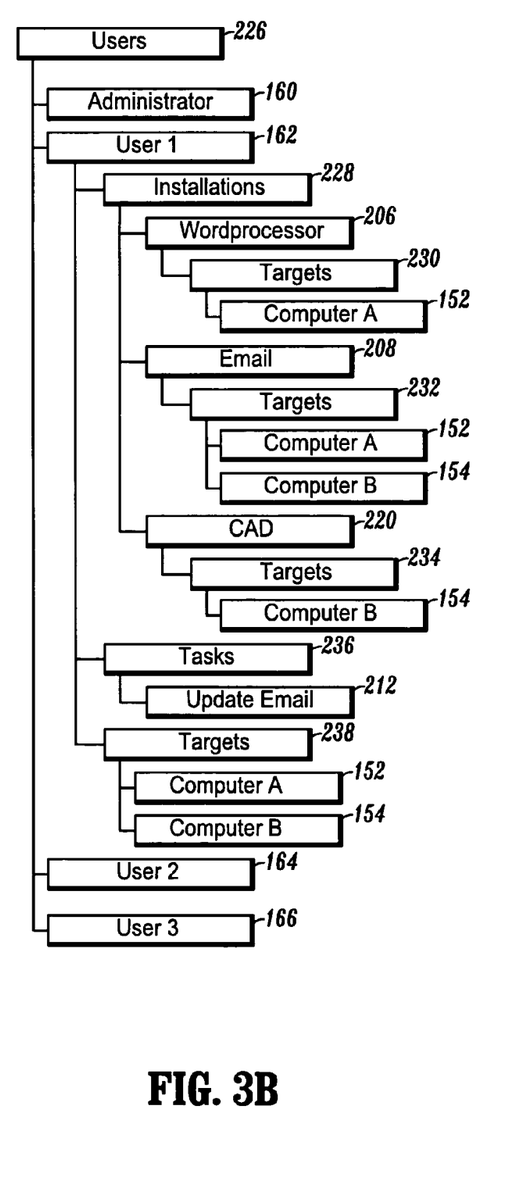

FIGS. 3A, 3B show examples of a computer-object view and a user-object view according to the method and system of the present disclosure. These views may be visible to an Administrator 160, and may serve to indicate associations between users, computers, tasks, and software applications. In a computer-object view, as shown in FIG. 3A, a Computers heading 200 is shown, followed by one or more computers listed individually or by group categorization. The Computers heading 200, for example, may be referred to as "All Targets" or some other heading that appropriately describes computer-objects. Managing computer system 150, Computer A 152 and Computer B 154 are shown beneath the Computers heading 150. In FIG. 3A expanded views for Computer A 152, and Computer B 154 are visible. In FIG. 3A, Computer A 152 includes Inventory area 202 and Installations area 204. Inventory area 202 may include a description of the hardware included in the computer system. In this example. Installations area 204 includes Wordprocessor software 206 and Email software 208 entries indicating the association of those application programs with Computer A 152. Those software applications listed beneath Installations area 204 may be stored on Computer A 152 or may be accessible via, for example, a network. For each computer, scheduled tasks may be shown in a Tasks area 210. An Email update task 212 appears for Computer A 152 which may be a result of a policy set by the administrator to update the Email software 208 and may be removed once the update is complete. User 1 162 and User 2 164 associated with Computer A 152 are shown in a Users area 214. Computer B 154 is shown beneath the Computers heading 200. Computer B 154 includes Inventory area 216 and Installations area 218 which includes computer aided design (CAD) program 220 and Email software 208. The Tasks area 222 includes the email update task 212. Areas for User 1 162 and User 3 166 associated with Computer B 154 are shown in a Users area 224.

Shown in FIG. 3B is a user-object view showing users of the system under a Users heading 226 including Administrator 160, User 1 162, User 2 164 and User 3 166. The Users heading 226, for example, may be referred to as "All Users" or some other heading that appropriately describes user-objects. Administrator 160, User 2 164 and User 3 166 also have associated information and are shown in an abbreviated, unexpanded form. An area beneath the heading User 1 162 includes Installations area 228. Tasks area 236 and Targets area 238. In this user-object view, Installations area 228 includes application programs associated with User 1, for example Wordprocessor 206, beneath which is listed the computers, or Targets 230, on which those programs are stored and/or executed. Additionally, if a user uses a computer, all installations for that computer may be added to the view of installations for the user. Similarly, if the same user also uses another computer, the installations view for that user may include the sum of both computers' installations.

In the example shown in FIG. 3B, the application program Wordprocessor 206 is stored on, or may be associated with, Computer A 152, the application program Email 208 is stored on, or may be associated with, both Computer A 152 and Computer B 154 listed beneath Targets 232, and the application program CAD 220 is stored on, or associated with, Computer B 154, listed beneath Targets 234. As described above, pending tasks, for example, a task of "Updating Email" 212, for updating the Email application program 208, are listed in the Tasks area 236. The computers with which User 1 is associated are listed in the Targets area 238. An administrator may interact with the view to reveal more information about or modify an entry. In one aspect of the system according to the present disclosure, the administrator may view information for User 2 164 and User 3 166 by selecting those users, using, for example, a clicking operation of a mouse.

The system and method of the present disclosure allows an administrator to view application programs available or assigned to a user or to remotely manage the computer to which a user currently is logged on. In the user-centric view as described herein, the computer may be viewed as a property of the user, rather than the user a property of the computer.

User Roles

Users may have one or more roles with respect to their duties within their organization, for example, programmer, data entry, point-of-sale operator. In one aspect of the system of the present disclosure, user roles may be implemented by creating a separate user group for each role and associating users with those groups. For example, users can be grouped into organizational or geographical groups, or any other type of group. A user group may be static, query, template and query/template. A new query attribute group may be introduced to handle attributes of the user object. It may also be desirable for user groups to contain other user groups or computer group, in addition to users.

In another aspect of the system of the present disclosure, a user-object data structure may include an area for storing a user role and/or a user group. In the system of the present disclosure, user roles may be used by the administrator for managing and configuring computers. In one aspect of the present disclosure, when an employee logs on to a computer, the computer may be configured for that user's needs automatically based on information stored in a database or entered by the user, for example, user role, computer role, location, etc. Optionally, the computer may check for updates every time a user logs on to the computer or periodically as specified by the computer administrator.

User roles may be categorized to include sub-categories. For example, the user role of programmer may have one or more sub-categories including different types of programmers.

Computer Role

A computer role describes a computer in terms of the operations which are performed by that computer, for example, a computer may be used as an email server, word processor or service desk workstation. In the system of the present disclosure, computer roles may be used by the administrator for managing and configuring computers. Computers may have multiple roles and computer roles may be categorized into groups having sub-groups of computer roles. In one aspect of the present disclosure, a computer role may be assigned by a user. An administrator may assign policies to computer roles for updating and configuration.

Policies, Tasks

In the present system, a computer administrator may create a policy, or rule, applicable to a user, user role, computer role, or other characteristic, which may define configuration tasks to be performed on computers. In one aspect of the present disclosure, a policy may include information describing those computers which will be affected by the policy. These computers may be identified based on their association with users having specified user-roles, or by other identifiers, such as computer-roles or the computers may be identified directly by some other naming convention. A policy may also include a name or descriptor of the software application used to modify the computer system, as well as the action or actions to be performed, such as installing, updating, deleting, configuring, etc. For example, a policy may provide that all computers associated with users having the user role of programmer are to receive a specified application program.

A policy may provide configuration information for a specific application program. For example, features of an email program may be enabled or disabled. By assigning a policy specifying a user role, configuration tasks may be scheduled for users not yet assigned that role. When the administrator assigns a user role to a user, the policies of the rule assigned may be enforced automatically, and any computers on which the user operates may be automatically configured accordingly.

A task may be any automated procedure performed on a computer. It may be an asset management policy or a software delivery installation. A task modifies the configuration of a computer so that it complies with a policy.

In one aspect of the present disclosure, tasks may be performed on computers selected based on, for example, user name, user role, computer role, other user or computer characteristic or a combination thereof. Tasks may be scheduled according to user, while the associated targets actually run the tasks. A user may be labeled as "multisystem," meaning that all targets that the user logs on to become associated targets. Tasks scheduled for a multisystem user may be run on all associated targets for that user.

To provide greater flexibility when selecting computers for modification, computers may be selected individually or by searching users, user roles and computer roles using logical operators, for example, AND, NOT, OR, etc. For example, once all computers in an enterprise have been allocated roles, an administrator may invoke a policy change without being cognizant of any actual computer names. The administrator may order that a task, such as installing a word processor, be implemented on all computers having a specific role. Continuing with this example, the administrator may further define the parameters by ordering the task performed on users having a specific role and in a particular group.

In one aspect of the present disclosure, tasks may be assigned using a "drag-and-drop" procedure whereby an administrator selects one or more software applications from a list displayed on a display screen, then drags icons representing the software applications to a point on the display screen overlapping one or more icons representing users or computers and drops them on the user or computer icons.

In another aspect of the present disclosure, a task may be scheduled, for example, for a specified user or for a user designated by a specified user role. Continuing the example, in the system of the present disclosure, it is possible to modify only those computers associated with a user which are designated by a specified computer role.

Directories

A directory is a storage area for storing user data, user roles, computer data, computer roles, application program data and other user and computer information. It may be desirable for the system of the present disclosure to use the organization information stored in existing directories by integrating with existing management systems. Such integration may be performed in a number of ways. For example, the directory may be a primary store for all application data. Integration may also be performed by publishing the directory through a directory interface. A standardized protocol, such as Lightweight Directory Access Protocol ("LDAP") may be used for accessing data from directories. By adding an LDAP gateway that translates the data models of desktop products into directory schemes, it is possible to publish a subset of objects for an entity without updating that entity's directories. Accordingly, two directories may be logically linked together so that it looks like one directory to end users.

In another alternative, it may be desirable to populate a target directory with a subset of application data from a database. The schema of the target directory may be extended with all the classes and attributes desired for storing the exported data. The exported data may be updated periodically to allow for objects that no longer exist and changes in values of attributes. The population may be performed using an LDAP Data Interchange Format ("LDIF").

In another alternative for directory integration, it may be desirable to populate a target database with data from an external directory. This may require mapping an entity s organizational hierarchy and performing desktop management based on that hierarchy. User and computer groups may be mapped to directory containers and groups through advanced LDAP search expressions. The members of the containers and groups in the directory may be populated into the groups of the desktop products if the objects also exist in the desktop database. The population may be either on-line meaning that it is performed every time accessed or off-line meaning that it is performed on a time schedule.

In yet another alternative for integration, it may be desirable to store references to objects in a directory and access the references through user interfaces ("UIs"), reports, events, etc. User and computer objects in desktop databases may store a reference to a corresponding object in a directory. The reference may be the distinguished name of the directory object. When viewing the objects in the desktop graphical user interfaces ("GUIs") and producing reports, the attributes stored in the directory may be displayed to enhance the user centric experience. LDAP search URLs to locate the objects in the directories may be stored globally and used when a new user or computer is registered to the desktop manager. It may be possible to manually map users and computers as well.

The system of the present disclosure may provide directory membership synchronization and utilization functionality to allow a computer administrator to use the organization information stored in existing directories. The computer administrator may create user roles or computer roles based on a result from a directory search operation. An example of a directory search may utilize natural language or structured query language (SQL) expressions. For example, a computer administrator may search for users who are members of the group 'Secretary' having a last name beginning with the letters 'SM', or the computer administrator may search for computers that are members of the group 'United Kingdom' and are members of the directory group 'Web Servers'. In this example, users or computers returned by the directory search operation may be assigned a user role or computer role, respectively. The evaluation of roles may be based on a time schedule defined by the computer administrator, making role assignment dynamic and automated. A directory query designer may be used to create a complete LDAP search URL to be used for synchronization of a desktop management computer and user groups with a directory.

When viewing user-objects and computer-objects, the computer administrator may be offered extended user and computer information retrieved from a directory. User information may include a user's full name, email address, street address, and for computers this may include an operating system, operating system version, service pack, and application programs resident on the computer. In general, any attribute that has been mapped into the generic directory schema at the time of directory integration configuration may be presented.

An EXE, such as a directory configuration wizard, may be used to map classes and attributes in a directory to a generic desktop management schema understood by all products. The wizard may be used to define the location of the directory with authentication details, map a user class, identity and attributes, and map a computer class, identity and attributes. After finalizing the wizard, all desktop management managers installed on a server may use the new directory definition.

Selection and Modification

Figure 4:
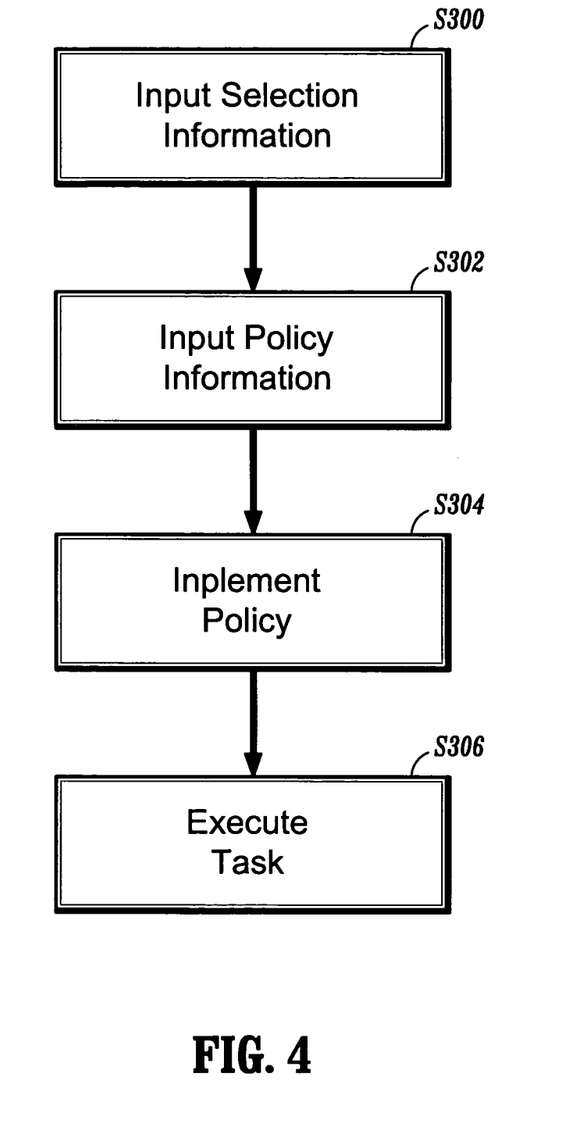
FIG. 4 shows an example of a process for selecting and modifying computer systems according to the method and system of the present disclosure.

FIG. 4 shows an example of a process for selecting and modifying computer systems according to the method and system of the present disclosure. In Step S300, a computer administrator enters information which may include, for example, user name, user role, user group, computer role, computer group, another identifying characteristic of a user or computer, or any combination thereof. This information may be used to search a database and produce a list of users and/or computers satisfying the information input. In step S302, the administrator inputs a policy to be implemented on the users/computers retrieved from the database. The policy may be saved for reference and implementation. In one aspect of the present disclosure, the system may check the new policy against existing policies in order to inform the administrator of conflicts. An example of policy conflict would be to schedule a modification for a program already scheduled to be deleted. In that example, a computer administrator may first input a policy to remove an application program from a computer associated with a user and, before the task of removing the application program is carried out, to input a second policy to modify the same application program from the same computer associated with the user. In the event a new policy conflicts with an existing policy, the administrator may be alerted and may have the option to edit or delete a policy. Similarly, if a computer has dual roles, the administrator may be alerted if one policy change made because of a first role conflicts with a second policy change made because of a second role. In Step S304, the administrator may execute a command to implement the policy, which may include scheduling and adding a task corresponding to the policy to the data structures of the users/computers retrieved from the database. In Step S306, the task is carried out of the selected computers.

Login and Configuration

Figure 5:
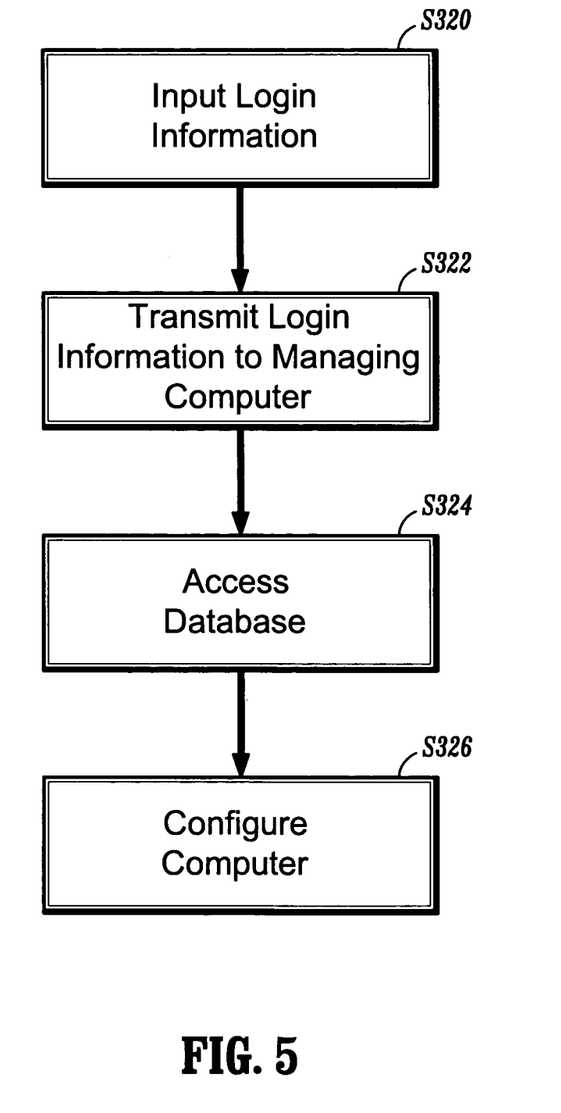
FIG. 5 shows an example of a computer system login and configuration process according to the method and system of the present disclosure.

An example of a computer system login and configuration process according to the system and method of the present disclosure is shown in FIG. 5. In step S320, a user inputs login information into a computer system, for example Computer A 152, running a Software Delivery Agent application. The Software Delivery Agent application monitors the users of Computer A 152, and, in step S322, transmits user login information, and/or information related to the users of Computer A 152, to a Software Delivery Server application running on Managing computer 160 via, for example, a communication network 156. By receiving this login information at the Managing computer 160, it is possible to always know where a user is logged on. In step S324, the Managing computer 160 searches for information, for example, a user-object in a database based on the received user login information. In one aspect of the system of the present disclosure, if a user-object does not exist for the user, one may be created and information relating to the user object stored in the database. It may also be possible to configure which types of users, such as none, only domain users, only local users or both domain and local users, to populate on the software delivery server. It may also be possible to decide whether to include the domain or computer name in the user-object's unique name.

The information stored in the database may include a user role, a computer role, policies and other information. In another aspect of the present disclosure, it may be possible to set up data transfers between users and user groups as well as computers and computer groups. In another aspect of the present disclosure, instead of the user role and computer role being determined from a database query, a user may provide the user role and/or the computer role information at Computer A 152, where it is then transmitted to the Managing computer 160 and stored in the database. In step S326, the Managing computer 160, based on the information retrieved from the database, configures Computer A 152 accordingly. Configuration may include modifying software used on Computer A 152. For example, Managing computer 160 may transmit and install operating systems, application programs, updates to application programs and operating systems, data files, or other types of information. Managing computer 160 may alter settings on the computer and/or may uninstall operating systems and application programs. The configuration process may allow a computer administrator to control the functionality and operation of Computer A 152.

The present system and method thus provides an efficient and convenient way for an administrator to configure and modify one or more computer systems. Numerous additional modifications and variations of the present disclosure are possible in view of the above-teachings. It is therefore to be understood that within the scope of the appended claims, the present disclosure may be practiced other than as specifically described herein.

What is claimed is:

1. A method for managing a plurality of computers, at least one of the plurality of computers associated with a user having a user characteristic, comprising:

displaying, to a network administrator, a user-object data structure comprising resource information identifying a plurality of network computers in an enterprise system that are used by a selected one of a plurality of users, the plurality of enterprise computers representing all of the network computers in the enterprise system that are used by the selected user;

receiving selection information from the network administrator, the selection information comprising a user characteristic associated with the selected user;

displaying graphically, to a network administrator, all of the network computers in the enterprise system that are used by the selected user based on the received selection information;

receiving management information from the network administrator;

identifying, as target computers to receive a modification, all of the plurality of network computers in the enterprise system that are used by the selected user;

selecting each of the target computers that are used by the selected user based on the selection information;

comparing the management information to existing scheduled policies to determine if one or more conflicts exist;

allowing the network administrator to modify the management information to resolve the one or more conflicts, if the one or more conflicts exist; and modifying each of the target computers that are used by the selected user based on the management information after the one or more conflicts are resolved.

2. The method as recited in claim 1, wherein the user characteristic is related to an employment function of the user.

3. The method as recited in claim 1, wherein the user characteristic is at least one of a user group and a geographic identifier.

4. The method as recited in claim 1, wherein the selection information further includes a computer characteristic; and the computer characteristic is related to a function of at least one of the plurality of computers.

5. The method as recited in claim 1, wherein the selection information further includes a computer characteristic, and the computer characteristic is at least one of a group, a geographic identifier, and configuration information.

6. The method as recited in claim 1, wherein modifying includes transmitting software to each of the target computers that are used by the selected user from a software database, and installing the software on each of the target computers that are used by the selected user.

7. The method as recited in claim 1, wherein the management information includes a software identifier and an action to be performed on each of the target computers that are used by the selected user.

8. The method as recited in claim 1, further comprising displaying the management information associated with the user, wherein the management information includes at least one installation associated with the user, and at least one task associated with the user.

9. The method as recited in claim 1, further comprising displaying information stored on at least one of the plurality of computers associated with the user.

10. The method as recited in claim 1, further comprising providing a link to information stored on at least one of the plurality of computers associated with the user.

11. The method as recited in claim 1, further comprising modifying a computer based on the user characteristic that is one of stored in a database and entered into the at least one selected computer by the user.

12. The method as recited in claim 1, further comprising storing at least one of a computer characteristic and the user characteristic in an external database.

13. The method as recited in claim 1, further comprising interfacing with an external database including at least one of a computer characteristic and the user characteristic.

14. The method as recited in claim 1, further comprising populating an external database including at least one of a computer characteristic and the user characteristic with application data.

15. The method as recited in claim 1, further comprising populating a target database with data from an external database, the data including at least one of a computer characteristic and the user characteristic.

16. The method as recited in claim 1, further comprising checking newly inputted management information against the management information for a conflict.

17. A non-transitory computer recording medium including computer executable code for managing a plurality of computers, at least one of the plurality of computers associated with a user having a user characteristic, the computer recording medium comprising:

code for displaying, to a network administrator, a user-object data structure comprising resource information identifying a plurality of enterprise computers in an enterprise system that are used by a selected one of a plurality of users, the plurality of enterprise computers representing all of the network computers that are used by the selected user;

code for receiving selection information from the network administrator, the selection information comprising a user characteristic associated with the selected user;

code for displaying graphically, to a network administrator, all of the network computers in the enterprise system that are used by the selected user based on the received selection information;

code for receiving management information from the network administrator;

code for identifying, as target computers, all of the plurality of network computers in the enterprise system that are used by the selected user;

code for selecting each of the target computers that are used by the selected user based on the selection information;

code for comparing the management information to existing scheduled policies to determine if one or more conflicts exist;

code for allowing the network administrator to modify the management information to resolve the one or more conflicts, if the one or more conflicts exist; and code for modifying each of the target computers that are used by the selected user based on the management information after the one or more conflicts are resolved.

18. The computer recording medium as recited in claim 17, wherein the user characteristic is related to an employment function of the user.

19. The computer recording medium as recited in claim 17, wherein the user characteristic is at least one of a user group and a geographic identifier.

20. The computer recording medium as recited in claim 17, wherein the selection information further includes a computer characteristic, and the computer characteristic is related to a function of at least one of the plurality of computers.

21. The computer recording medium as recited in claim 17, wherein the selection information further includes a computer characteristic, and the computer characteristic is at least one of a group, a geographic identifier, and configuration information.

22. The computer recording medium as recited in claim 17, wherein the code for modifying comprises code for transmitting software to each of the target computers from a software database, and code for installing the software on each of the target computers that are used by the selected user.

23. The computer recording medium as recited in claim 17, wherein management information includes a software identifier and an action to be performed on each of the target computers that are used by the selected user.

24. The computer recording medium as recited in claim 17, further comprising:

code for displaying the management information associated with the user, wherein the management information includes at least one installation associated with the user, and at least one task associated with the user.

25. The computer recording medium as recited in claim 17, further comprising: code for displaying information stored on at least one of the plurality of computers associated with the user.

26. The computer recording medium as recited in claim 17, further ~: comprising: code for providing a link to information stored on at least one of the plurality of computers associated with the user.

27. The computer recording medium as recited in claim 17, further comprising: code for modifying a computer based on the user characteristic that is one of stored in a database and entered into the at least one selected computer by the user.

28. The computer recording medium as recited in claim 17, further comprising: code for storing at least one of a computer characteristic and the user characteristic in an external database.

29. The computer recording medium as recited in claim 17, further comprising:
code for interfacing with an external database including at least one of a computer characteristic and the user characteristic.

30. The computer recording medium as recited in claim 17, further comprising:
code for populating an external database including at least one of a computer characteristic and the user characteristic with application data.

31. The computer recording medium as recited in claim 17, further comprising:
code for populating a target database with data from an external database, the data including at least one of a computer characteristic and the user characteristic.

32. The computer recording medium as recited in claim 17, further comprising: code for checking newly inputted management information against the management information for a conflict.

33. A programmed computer system for managing a plurality of computers, at least one of the plurality of computers associated with a user having a user characteristic, the programmed computer system residing on a non-transitory computer-readable medium and comprising instructions for causing a computer to perform the following operations:
display, to a network administrator, a user-object data structure comprising resource information identifying a plurality of network computers in an enterprise system that are used by a selected one of a plurality of users, the plurality of network computers representing all of the network computers in the enterprise system that are used by the selected user;
receive selection information from the network administrator, the selection information comprising a user characteristic associated with the selected user;
display graphically, to a network administrator, all of the network computers in the enterprise system that are used by the selected user based on the received selection information;
receive management information from the network administrator;
identify, as target computers, all of the plurality of network computers in the enterprise system that are used by the selected user;
select each of the target computers that are used by the selected user based on the selection information;
compare the management information to existing scheduled policies to determine if one or more conflicts exist;
allow the network administrator to modify the management information to resolve the one or more conflicts, if the one or more conflicts exist; and
modify each of the target computers that are used by the selected user based on the management information after the one or more conflicts are resolved.

34. The programmed computer system as recited in claim 33, wherein the user characteristic is related to an employment function of the user.

35. The programmed computer system as recited in claim 33, wherein the user characteristic is at least one of a user group and a geographic identifier.

36. The programmed computer system as recited in claim 33, wherein the selection information further includes a computer characteristic, and the computer characteristic is related to a function of at least one of the plurality of computers.

37. The programmed computer system as recited in claim 33, wherein the selection information further includes a computer characteristic, and the computer characteristic is at least one of a group, a geographic identifier, and configuration information.

38. The programmed computer system as recited in claim 33, further comprising instructions for causing a computer to transmit software to each of the target computers from a software database, and install the software on each of the target computers that are used by the selected user.

39. The programmed computer system as recited in claim 33, wherein the management information includes a software identifier and an action to be performed on each of the target computers.

40. The programmed computer system as recited in claim 33, further comprising instructions for causing a computer to display the management information associated with the user, wherein the management information includes at least one installation associated with the user, and at least one task associated with the user.

41. The programmed computer system as recited in claim 33, further comprising instructions for causing a computer to display information stored on at least one of the plurality of computers associated with the user.

42. The programmed computer system as recited in claim 33, further comprising instructions for causing a computer to provide a link to information stored on at least one of the plurality of computers associated with the user.

43. The programmed computer system as recited in claim 33, further comprising instructions for causing a computer to modify a computer based on the user characteristic that is one of stored in a database and entered into the at least one selected computer by the user.

44. The programmed computer system as recited in claim 33, further comprising instructions for causing a computer to store at least one of a computer characteristic and the user characteristic in an external database.

45. The programmed computer system as recited in claim 33, further comprising instructions for causing a computer to interface with an external database including at least one of a computer characteristic and the user characteristic.

46. The programmed computer system as recited in claim 33, further comprising instructions for causing a computer to populate an external database including at least one of a computer characteristic and the user characteristic with application data.

47. The programmed computer system as recited in claim 33, further comprising instructions for causing a computer to populate a target database with data from an external database, the data including at least one of a computer characteristic and the user characteristic.

48. The programmed computer system as recited in claim 33, further comprising instructions for causing a computer to check newly inputted management information against the management information for a conflict.

49. A system for managing a plurality of computers, comprising:
a plurality of network computers; and a managing computer coupled to the network computers by a network and operable to manage the plurality of network computers, the managing computer comprising a central processing unit operable to:
display, to a network administrator, a user-object data structure comprising resource information identifying a plurality of network computers in an enterprise system that are used by a selected one of a plurality of users, the plurality of network computers representing all of the network computers in the enterprise system that are used by the selected user;

receive selection information from the network administrator, the selection information comprising a user characteristic associated with the selected user;
display graphically, to a network administrator, all of the network computers in the enterprise system that are used by the selected user based on the received selection information;
receive management information from the network administrator;
identify, as target computers, all of the plurality of network computers in the enterprise system that are used by the selected user;
select each of the target computers that are used by the selected user based on the selection information;
compare the management information to existing scheduled policies to determine if one or more conflicts exist;
allow the network administrator to modify the management information to resolve the one or more conflicts, if the one or more conflicts exist; and
modify each of the target computers that are used by the selected user based on the management information after the one or more conflicts are resolved.

50. The system as recited in claim 49, wherein the user characteristic is related to an employment function of the user.

51. The system as recited in claim 49, wherein the user characteristic is at least one of a user group and a geographic identifier.

52. The system as recited in claim 49, wherein the selection information further comprises a computer characteristic, and the computer characteristic is related to a function of at least one of the plurality of computers.

53. The system as recited in claim 49, wherein the selection information further comprises a computer characteristic, and the computer characteristic is at least one of a group, a geographic identifier, and configuration information.

54. The system as recited in claim 49, wherein when modifying the at least one selected computer, the central processing unit is operable to:
transmit software to each of the target computers from a software database, and install the software on each of the target computers.

55. The system as recited in claim 49, wherein the management information comprises a software identifier and an action to be performed on each of the target computers.

56. The system as recited in claim 49, wherein the at least one selected computer is further operable to display the management information associated with the user to the network administrator, wherein the management information includes at least one installation associated with the user, and at least one task associated with the user.

57. The system as recited in claim 49, wherein the at least one selected computer is further operable to display information stored on at least one of the plurality of computers associated with the user to the network administrator.

58. The system as recited in claim 49, wherein the at least one selected computer is further operable to provide a link to information stored on at least one of the plurality of computers associated with the user.

59. The system as recited in claim 49, wherein the at least one selected computer is further operable to modify a computer based on the user characteristic that is one of stored in a database and entered into the at least one selected computer by the user.

60. The system as recited in claim 49, wherein the at least one selected computer is further operable to store at least one of a computer characteristic and the user characteristic in an external database.

61. The system as recited in claim 49, wherein the at least one selected computer is further operable to interface with an external database including at least one of a computer characteristic and the user characteristic.

62. The system as recited in claim 49, wherein the at least one selected computer is further operable to populate an external database including at least one of a computer characteristic and the user characteristic with application data.

63. The system as recited in claim 49, wherein the at least one selected computer is further operable to populate a target database with data from an external database, the data including at least one of a computer characteristic and the user characteristic.

64. The system as recited in claim 49, wherein the at least one selected computer is further operable to check newly inputted management information against the management information for a conflict.

65. A method for managing a plurality of computers associated with a user having a user characteristic, comprising:
displaying, to a network administrator resource information identifying a plurality of network computers in an enterprise system that are used by a single user, the plurality of network computers representing all of the network computers in the enterprise system that are used by the single user;
receiving selection information from the network administrator, the selection information comprising a user characteristic associated with the user;
displaying graphically, to a network administrator, all of the network computers in the enterprise system that are used by the selected user based on the received selection information;
receiving management information from the network administrator;
identifying, as target computers, all of the plurality of network computers that are used by the single user;
based on the selection information, selecting each of the plurality of network computers that are associated with the single user;
comparing the management information to existing scheduled policies to determine if one or more conflicts exist;
allowing the network administrator to modify the management information to resolve the one or more conflicts, if the one or more conflicts exist; and
modifying each of the plurality of network computers associated with the single user based on the management information after the one or more conflicts are resolved.

66. A method for managing a plurality of computers associated with a user having a user characteristic, comprising:
displaying, to a network administrator resource information identifying a plurality of network computers that are used by a single user;
receiving selection information from the network administrator, the selection information comprising a user characteristic associated with the user;
displaying graphically, to a network administrator, all of the network computers in the enterprise system that are used by the selected user based on the received selection information;
receiving management information from the network administrator;
identifying, as target computers, each of the plurality of network computers that are used by the single user;

based on the selection information, selecting each of the plurality of network computers that are associated with the single user;

comparing the management information to existing scheduled policies to determine if one or more conflicts exist;

allowing the network administrator to modify the management information to resolve the one or more conflicts, if the one or more conflicts exist; and modifying each of the plurality of network computers associated with the single user based on the management information after the one or more conflicts are resolved; and wherein selecting and modifying are performed when the user becomes newly associated with at least one of the target computers.

67. The method as recited in claim 65, wherein selecting and modifying are performed when the user characteristic is one of changed and added.

68. The method as recited in claim 65, wherein the user characteristic is related to an employment function of the user.

69. The method as recited in claim 65, wherein the user characteristic is at least one of a user group and a geographic identifier.

70. The method as recited in claim 65, wherein the selection information further includes a computer characteristic; and the computer characteristic is related to a function of at least one of the plurality of computers.

71. The method as recited in claim 65, wherein the selection information further includes a computer characteristic, and the computer characteristic is at least one of a group, a geographic identifier, and configuration information.

72. The method as recited in claim 65, wherein modifying includes transmitting software to each of the target computers that are used by the selected user from a software database, and installing the software on each of the target computers that are used by the selected user.

73. The method as recited in claim 65, wherein the management information includes a software identifier and an action to be performed on each of the target computers that are used by the selected user.

74. The method as recited in claim 65, further comprising displaying the management information associated with the user, wherein the management information includes at least one installation associated with the user and at least one task associated with the user.

75. The method as recited in claim 65, further comprising displaying information stored on at least one of the plurality of computers associated with the user.

76. The method as recited in claim 65, further comprising providing a link to information stored on at least one of the plurality of computers associated with the user.

77. The method as recited in claim 65, further comprising modifying a computer based on the user characteristic that is one of stored in a database and entered into the at least one selected computer by the user.

78. The method as recited in claim 65, further comprising interfacing with an external database including at least one of a computer characteristic and the user characteristic.

79. The method as recited in claim 65, further comprising populating an external database including at least one of a computer characteristic and the user characteristic with application data.

80. The method as recited in claim 65, further comprising populating a target database with data from an external database, the data including at least one of a computer characteristic and the user characteristic.

81. The method as recited in claim 65, further comprising checking newly inputted management information against the management information for a conflict.

* * * * *

UNITED STATES PATENT AND TRADEMARK OFFICE
CERTIFICATE OF CORRECTION

| | | |
|---|---|---|
| PATENT NO. | : 8,561,053 B2 | Page 1 of 1 |
| APPLICATION NO. | : 10/759774 | |
| DATED | : October 15, 2013 | |
| INVENTOR(S) | : Philip Barthram et al. | |

It is certified that error appears in the above-identified patent and that said Letters Patent is hereby corrected as shown below:

In the Claims

Column 12, line 57 (claim 26, line 2) please change "further ~: comprising" to -- further comprising --

Signed and Sealed this
Third Day of June, 2014

Michelle K. Lee
*Deputy Director of the United States Patent and Trademark Office*